June 11, 1935.  F. S. MEAD  2,004,169
APPARATUS AND METHOD FOR CONVEYING THREADS
Filed July 14, 1934  2 Sheets-Sheet 1
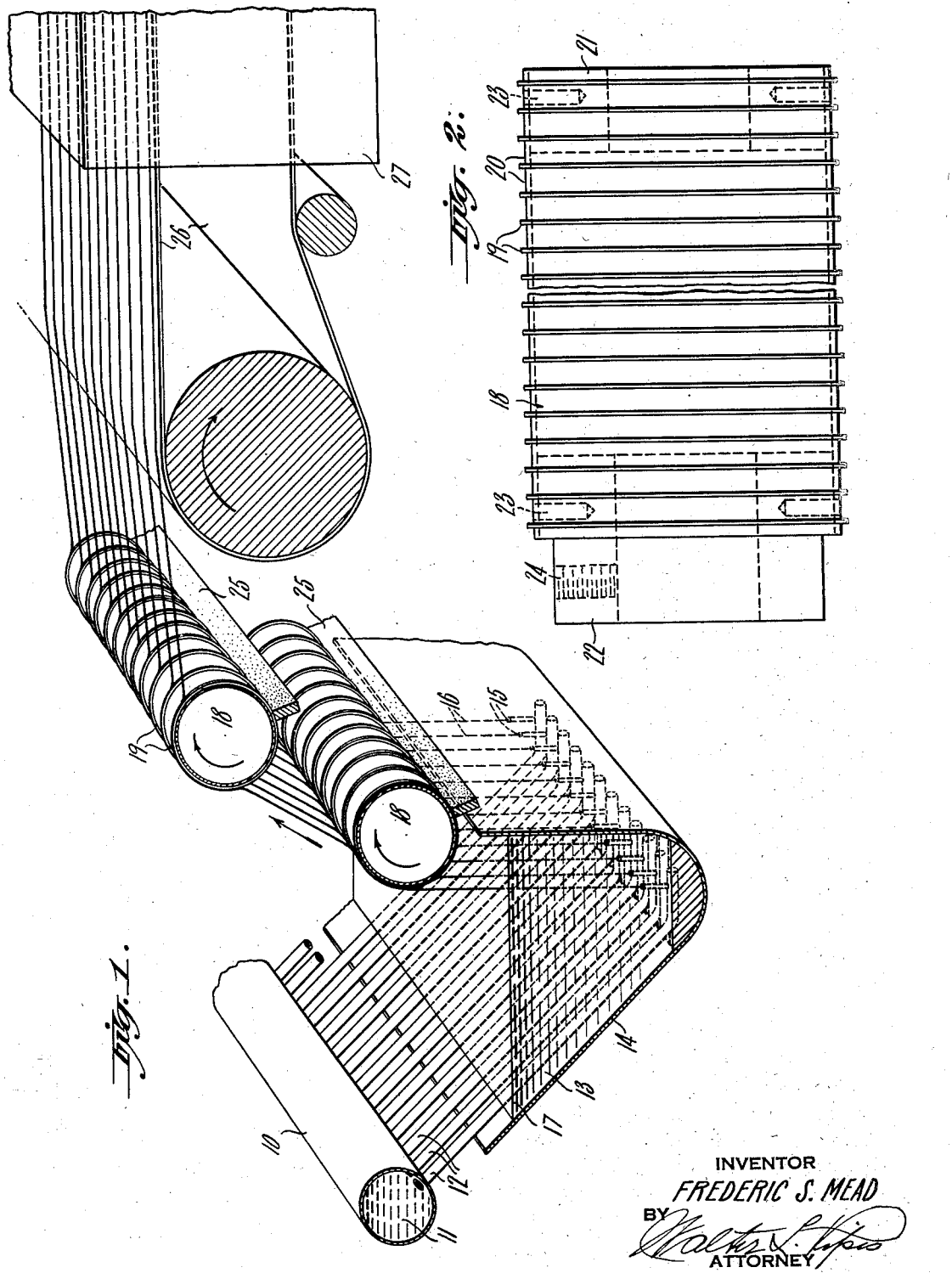
INVENTOR
FREDERIC S. MEAD
BY
ATTORNEY June 11, 1935. F. S. MEAD 2,004,169
APPARATUS AND METHOD FOR CONVEYING THREADS
Filed July 14, 1934  2 Sheets-Sheet 2
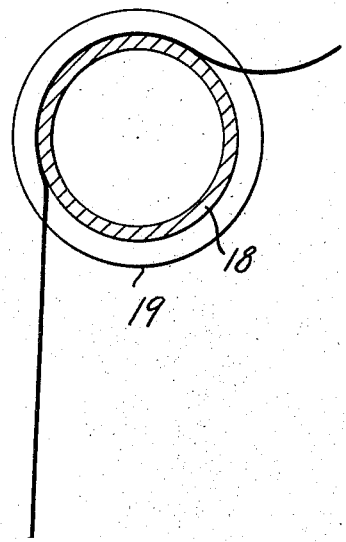
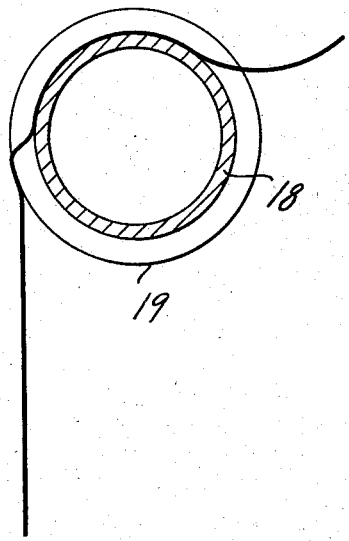
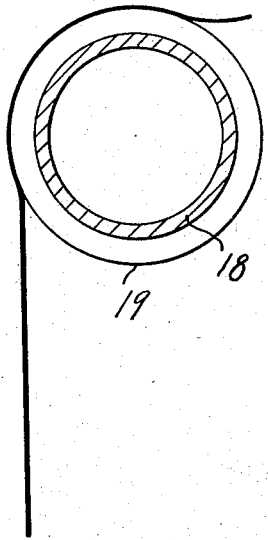
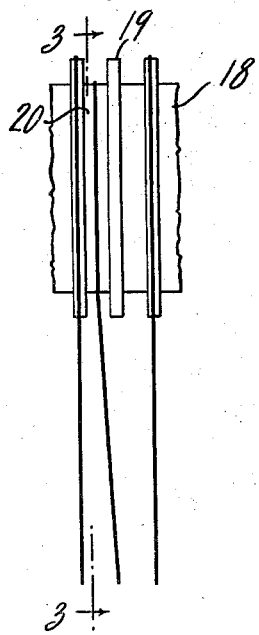
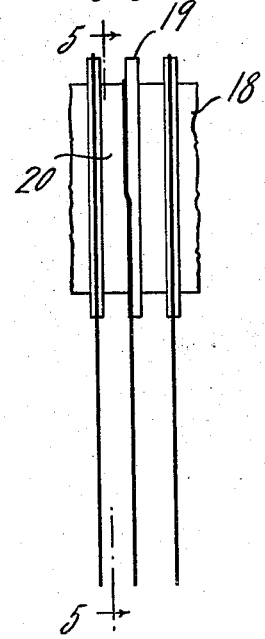
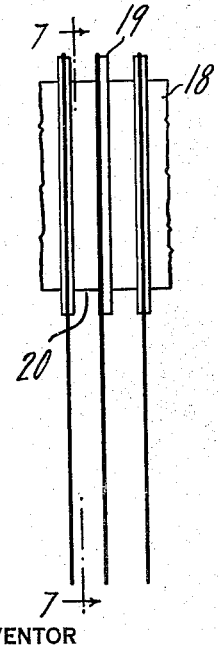
INVENTOR
FREDERIC S. MEAD
BY
ATTORNEY Patented June 11, 1935

2,004,169

UNITED STATES PATENT OFFICE 2,004,169

APPARATUS AND METHOD FOR CONVEYING THREADS

Frederic S. Mead, Cranston, R. I., assignor, by mesne assignments, to United States Rubber Company, New York, N. Y., a corporation of New Jersey Application July 14, 1934, Serial No. 735,161

12 Claims. (Cl. 18—8)

This invention relates to an apparatus and method for conveying threads and more particularly for transferring a plurality of threads from one operation to a subsequent operation without the threads touching one another.

In one method of manufacturing rubber thread, as shown for example in Patents Nos. 1,545,257, 1,947,080 and 1,947,090, an aqueous dispersion of rubber, such as latex, is streamed through a series of orifices or spinerets into a coagulant and the filamentary coagula thus formed are transferred from the coagulant to subsequent operations, preferably by means of a pull-roll which engages the filaments on its surface and conveys them to such subsequent operation. The surface of such pull-rolls has heretofore been made smooth and the threads as they leave the liquid coagulant are transferred to the next operation aided by the rotation of the roll. Due to vibration of the machine, air currents, and the like, there is a tendency for the threads being conveyed by the pull-roll to touch one another, in which case a so-called "doubling" of the threads occurs, and this doubling continues to run until noticed by the operator and separated at the spinnerets. Doubled threads occurring at this stage of the operation cannot successfully be separated and hence must be scrapped. As in Patents Nos. 1,947,080 and 1,947,090, where the threads are transferred directly to a drier, or through a washing operation and then onto a drier belt, the "doubling" of some of the threads necessitates cutting out of the "doubled" portions at the end of the process and tying together the good ends, thus forming undesirable knots in the finished product. Also, this cutting out of portions of the thread due to such "doubling" interrupts the continuity of the process and subsequent operations, and effects great disadvantage in the handling of large amounts of thread in continuous or semi-continuous operations. For this reason, especially with fine threads which are more sensitive to outside influences than coarser threads, it has been found necessary with smooth pull-rolls to widely space the threads and thus reduce the capacity of the machine. With extruded rubber threads up to about a fiftieth of an inch in diameter, it was necessary to space the threads at three-eighths of an inch intervals.

According to the present invention, the pull-rolls over which such a plurality of threads are conveyed, are so modified that fine threads may be successfully transferred from one operation to a subsequent operation spaced apart no more than a quarter of an inch. This modification of the pull roll from the smooth surface heretofore used, increases the capacity of a given machine 50%, and the tendency of the threads to touch one another is no more, if as much, as when spaced three-eighths of an inch apart on a smooth roll.

In the drawings—

Figure 1 is a perspective view of that portion of a thread making apparatus embodying the present invention, Figure 2 is a detailed view of the pull-roll, and Figures 3 to 8 diagrammatically illustrate the transfer of a thread from a channel to a ridge on the pull-roll, Figures 3, 5 and 7 being cross sections on the lines 3—3, 5—5 and 7—7 of the side views in Figures 4, 6 and 8 respectively.

According to the invention, a plurality of threads which are to be transferred from one operation to a subsequent operation without touching one another are passed over one or more pull-rolls having on the surface thereof a plurality of spaced parallel circumferential ridges. There is associated with these threads at least at the surface of the roll a liquid material which is capable of wetting both the roll and the thread. It is found under these conditions that the threads will ride on the tops of these ridges, being kept from falling into the channels between the same or crossing from one ridge to another by the surface tension effect of the liquid associated with the thread on the top surfaces of the ridges. By making the ridges relatively narrow and the channels between them spaced relatively wide apart, a plurality of threads in being conveyed from one operation to the next over such pull-rolls will be prevented from touching one another either on the surface of the roll or in travelling to or from such surface. By making the sides of the channels normal to the axis of the pull-roll, a thread if in a channel and moved to a corner position will automatically ride up onto the adjacent ridge. The vibration of the machine and ordinary air currents however are generally insufficient to overcome the surface tension effect of the liquid which maintains the threads on the ridges and prevents them from falling into the channels or crossing from one ridge to an adjacent one. With smooth pull rolls there is no such mechanical separation of the various threads as would prevent their sliding laterally along the surface by virtue of external forces due to vibration of the machine, air current, and the like, and thus in many instances causing "doubling" of threads. The liquid which wets the top surfaces of the ridges and whose surface tension effect maintains the threads riding on such top surfaces, may accompany the threads from a prior operation such as a coagulation operation in the formation of the thread, as in the manufacture of rubber thread by extrusion of latex into a coagulant, or in the manufacture of inelastic threads from cellulose or cellulose derivatives; or the threads may in their travel reach the pull-rolls in a dry condition and a liquid material may be applied to the surface of the roll in order to produce the desired effect of maintaining the threads riding on the top surfaces of the ridges.

The threads in any case must not be so heavy as to readily overcome by their weight the forces due to the surface tension of the liquid which maintain them riding on the top surfaces of the ridges. With various liquids having different properties of surface tension and different wetting properties, and with various types of threads, the maximum size of the thread which can be successfully transferred by the apparatus of the present invention will vary, and it is not intended to include in the description or claims any thread of such a size that the forces due to its weight will readily overcome those forces due to the surface tension of the liquid which tends to maintain such thread riding on the top of the ridges.

In the case of rubber threads made by extruding latex into a coagulant, such as an aqueous solution of acetic acid, threads up to one-fiftieth of an inch in diameter are readily maintained on the top surface of the ridges by the coagulant accompanying the threads from the surface of the coagulating bath. With larger size threads, that is, where the forces due to the weight of the thread more nearly approach or exceed the forces due to the surface tension of the coagulant which tend to maintain the threads on the top surface of the ridges, there is fortunately no need for such ridges on the pull-rolls since those external forces, such as machine vibrations and air currents, which tend to displace the threads or swing them back and forth in their travel from one operation to the next over the pull-roll, are in practice insufficient to overcome the inertia of such larger sizes of thread. In practice it has been found where threads are so heavy as to overcome the forces due to the surface tension of the liquid tending to maintain them on the ridges of the pull-rolls, the threads themselves are heavy enough to overcome any vibration or air current effects, and therefore smooth surfaced pull-rolls are satisfactory for transferring such threads.

The drawings illustrate but one application of the present invention wherein the pull-rolls are used to transfer a plurality of coagulated latex threads from a coagulant onto a belt to a drying operation. It is evident that these rolls may be used for transferring threads from any one of a number of operations to another operation and may be used in the manufacture of threads other than rubber threads.

Referring more particularly to the drawings, 10 illustrates a manifold which supplies latex 11 under a constantly maintained head through a plurality of nozzles or spinnerets 12 into a coagulant bath 13 in tank 14. The latex as it is extruded through the orifices 15 of the nozzles 12 into the coagulant is coagulated and the filamentary coagula 16 thus formed are drawn through the coagulant and from the surface 17 of the same over one or more pull-rolls 18 and to a subsequent operation. In the drawings the filamentary coagula are shown passing over two pull-rolls but one or more than two such rolls may be used in succession in transferring the formed threads to a subsequent drying operation. Pull-roll 18 is shown in detail in Fig. 2 where the surface of the roll is shown formed with a plurality of relatively narrow parallel circumferential ridges 19 having flat top surfaces and spaced relatively widely apart by channels 20 having sides normal to the axis of the pull-roll. The pull-roll as shown is constructed from a hollow cylinder preferably of metal tubing, with the parallel circumferential ridges lying in planes normal to the axis of the roll. The top surfaces of the ridges may be concave or convex as well as flat if desired. The sides of the channels are normal to the axis of the pull-roll in order to allow a thread if in a channel and moved to a corner position to automatically ride up onto the adjacent ridge as shown in detail in Figures 3 to 8. The sides however may be at an angle to the axis of the pull-roll or may be curved, if desired. Mounting collars 21 and 22 for the driving shaft of the pull-roll are fitted into the ends of the tubing by driving pins 23 and an opening 24 is tapped in the collar 22 which has an extension beyond the end of the pull-roll for receiving a set screw for locking the pull-roll to the driving shaft for rotation therewith. Wipers 25 are maintained in contact with the rotating pull-rolls 18 in order to remove excess of the coagulant carried along by the threads 16 in their passage over the pull-rolls to belt 26 and into the drier 27.

In operation the freshly coagulated threads pass from the surface of the coagulant over the pull-roll and by virtue of the surface tension of the coagulant carried by the thread and wetting the top surfaces of the ridges, each thread is maintained on its own ridge without falling into the channel between its ridge and the adjacent ridge, and without passing over to the next ridge. In this way ordinary machine vibrations and air current will not be sufficient to laterally move the threads along the surface of the roll and cause "doubling" of threads.

If by chance a thread should, however, be riding in a channel, it is a simple matter as shown in Figures 3 to 8 to return the thread to the top surface of its proper ridge. For example, if thread "A" is in the channel 20 as shown in Figures 3 and 4, it is only necessary to move the thread manually by means of a rod or wire to the corner position of the channel adjacent its proper ridge 19 as shown in Figures 5 and 6, and as the pull-roll rotates the thread will be automatically carried up the wall of the channel as shown in Figures 7 and 8 onto the top surface of the ridge. In practice, it is found that the moving of the thread to the proper side of the channel from some mid-position is also many times automatically accomplished by air currents or other forces. As many consecutive pull-rolls may be used as are necessary in order to transfer the threads from one operation to another, the pull-rolls being so constructed that they may be placed relatively close to one another and to the apparatus for the various consecutive operations. In this way the undesirable effect of the swinging of threads as they pass between consecutive pull-rolls or between a pull-roll and a manufacturing operation is minimized. In practice, it is a simple matter to arrange the pull-rolls and the other apparatus so that insufficient swinging will take place in travelling between the same to permit "doubling", or chafing of the threads against one another which is especially undesirable in the manufacture of threads made from cellulose and cellulose derivatives. In the manufacture of extruded rubber threads up to about one fiftieth of an inch in diameter, it has been found satisfactory to utilize ridges a thirty-second of an inch wide and one-sixteenth of an inch in height spaced one-quarter of an inch between centers. With smooth pull-rolls, the same threads would have to be spaced three-eighths of an inch apart in practice. This substantially increases the capacity of a thread making machine 50%. The pull-roll is shown made from a hollow cylinder or tubing, but, of course, it may be made from a series of thin disc-like members with spacers between the same. The grooves are shown with more or less perpendicular side walls but these may be at an angle to the axis of the cylinder or curved and more or less satisfactory results obtained.

As various other modifications will occur to those skilled in the art, it is not intended to limit the invention other than as set forth in the appended claims.

Having thus described my invention, what I claim and desire to protect by Letters Patent is:

1. In an apparatus for conveying a plurality of threads, a rotating pull-roll having on the surface thereof a plurality of spaced parallel circumferential ridges on which the threads ride and from the tops of which the threads are kept from falling into the channels therebetween by a liquid associated with the threads at least at the surface of the roll.

2. In an apparatus for conveying a plurality of threads, a rotating pull-roll having on the surface thereof a plurality of relatively narrow parallel circumferential ridges spaced relatively widely apart the planes of which are normal to the axis of the roll, and on which the threads ride and from the tops of which the threads are kept from falling into the channels therebetween by a liquid associated with the threads at least at the surface of the roll.

3. In an aparatus for transferring a plurality of coagulated threads from a liquid coagulant to a subsequent operation without touching one another, a rotating pull-roll having on its surface a plurality of spaced parallel circumferential ridges, the planes of which and the sides of the channels between which are normal to the axis of the roll, and on the tops of which ridges the threads ride and from which they are kept from falling into the channels therebetween by the coagulant accompanying the threads and wetting at least the tops of the ridges.

4. In an apparatus for transferring a plurality of coagulated threads from a liquid coagulant to a subsequent operation without touching one another, a rotating pull-roll having on its surface a plurality of relatively narrow parallel circumferential ridges having approximately flat top surfaces, the planes of which ridges and the sides of the channels between which are normal to the axis of the roll, and on which top surfaces the threads ride and from which they are kept from falling into the channels therebetween by the coagulant accompanying the threads and wetting at least the top surfaces of the ridges.

5. In an apparatus for transferring a plurality of coagulated threads from a liquid coagulant to a subsequent operation without touching one another, a rotating pull-roll having on its surface a plurality of relatively narrow parallel circumferential ridges spaced relatively widely apart, the planes of which and the sides of the channels between which are normal to the axis of the roll and on the tops of which ridges the threads ride and from which they are kept from falling into the channels therebetween by the coagulant accompanying the threads and wetting at least the tops of the ridges.

6. The method of conveying a plurality of threads without touching one another comprising passing said threads over a rotating pull-roll having on its surface a plurality of spaced parallel circumferential ridges the planes of which are normal to the axis of the roll, contacting each thread with the top surface of a ridge and maintaining such threads riding on such top surfaces as the roll rotates by a liquid associated with such threads at least at the surface of the roll.

7. The method of conveying a plurality of threads without touching one another comprising passing said threads over a rotating pull-roll having on its surface a plurality of relatively narrow parallel circumferential ridges spaced relatively widely apart, the planes of which are normal to the axis of the roll, contacting each thread with the top surface of a ridge and maintaining said threads riding on such top surfaces as the roll rotates by a liquid associated with said threads at least on the surface of the roll.

8. The method of conveying a plurality of threads from the surface of a liquid to a subsequent operation without touching one another comprising passing said threads from the surface of the liquid over a rotating pull-roll having on its surface a plurality of spaced parallel circumferential ridges, the planes of which are normal to the axis of the roll, and contacting each thread with the top surface of a ridge whereby the threads are maintained riding on the top surfaces of the ridges and are kept from falling into the channels therebetween by the liquid accompanying the threads and wetting at least the top surfaces of the ridges.

9. The method of conveying a plurality of threads from the surface of a liquid to a subsequent operation without touching one another comprising passing said threads from the surface of the liquid over at rotating pull-roll having on its surface a plurality of relatively narrow parallel circumferential ridges spaced relatively widely apart, the planes of which and the sides of the channels between which are normal to the axis of the roll, and contacting each thread with the top surface of a ridge whereby the threads are maintained riding on the rop surfaces of the ridges and are kept from falling into the channels therebetween by the liquid accompanying the threads and wetting at least the top surfaces of the ridges.

10. The method of transferring a plurality of rubber threads from a coagulant in which they are formed by an extrusion of latex into such coagulant to a subsequent operation comprising removing the coagulated threads from the coagulant and passing the same over a rotating pull-roll having on its surface a plurality of spaced parallel circumferential ridges the planes of which are normal to the axis of the roll, and contacting each thread with the top surface of a ridge whereby the threads are maintained riding on the top surfaces of the ridges and are kept from falling into the channels therebetween by the coagulant accompanying the threads and wetting at least the top surfaces of the ridges.

11. The method of transferring a plurality of rubber threads from a coagulant in which they are formed by an extrusion of latex into such coagulant to a subsequent operation comprising removing the coagulated threads from the coagulant and passing the same over a rotating pull-roll having on its surface a plurality of relatively narrow parallel circumferential ridges spaced relatively widely apart, the planes of which and the sides of the channels between which are normal to the axis of the roll, and contacting each thread with the top surface of a ridge whereby the threads are maintained riding on the top surfaces of the ridges and are kept from falling into the channels therebetween by the coagulant accompanying the threads and wetting at least the top surfaces of the ridges.

12. The method of transferring a plurality of rubber threads from a coagulant in which they are formed by an extrusion of latex into such coagulant to a subsequent operation comprising removing the coagulated threads from the coagulant and passing the same over a rotating pull-roll having on its surface a plurality of spaced parallel approximately flat-topped circumferential ridges the planes of which ridges are normal to the axis of the roll, and contacting each thread with a top surface whereby the threads are maintained riding on such top surfaces and are kept from falling into the channels therebetween by the coagulant accompanying the threads and wetting at least such top surfaces of the ridges.

FREDERIC S. MEAD.